United States Patent [19]

Lupo et al.

[11] Patent Number: 5,107,374
[45] Date of Patent: Apr. 21, 1992

[54] REARVIEW MIRROR ASSEMBLY FOR A VEHICLE

[75] Inventors: Elio Lupo, Turin; Alberto Zuccotti, Sancino, both of Italy

[73] Assignees: Gilardini S.p.A.; Iveco Fiat S.p.A., both of Turin, Italy

[21] Appl. No.: 454,762

[22] Filed: Dec. 21, 1989

[30] Foreign Application Priority Data

Dec. 23, 1988 [IT] Italy ................. 68153 A/88

[51] Int. Cl.⁵ .............. G02B 5/08; B60R 1/06
[52] U.S. Cl. .................. 359/841; 359/881; 248/478; 248/480; 248/484
[58] Field of Search ............... 350/604, 605, 606, 626, 350/631, 632, 639; 248/475.1, 476, 478, 479, 480, 484, 486, 487

[56] References Cited

U.S. PATENT DOCUMENTS

| | | | |
|---|---|---|---|
| 2,839,965 | 6/1958 | Budreck | 248/480 |
| 3,294,438 | 12/1966 | Carson, Jr. et al. | 248/480 |
| 3,377,880 | 4/1968 | Carter, Jr. | 350/604 |
| 3,482,811 | 12/1969 | Zent | 248/485 |
| 3,536,382 | 10/1970 | McKee et al. | 350/605 |
| 4,077,597 | 3/1978 | Greig | 248/479 |
| 4,157,862 | 6/1979 | Jackson | 350/627 |
| 4,363,534 | 12/1982 | Covert | 350/604 |

FOREIGN PATENT DOCUMENTS 0251255  11/1987  Japan .................... 350/632

*Primary Examiner*—Bruce Y. Arnold
*Assistant Examiner*—R. D. Shafer
*Attorney, Agent, or Firm*—Gifford, Groh, Sprinkle, Patmore and Anderson

[57] ABSTRACT

A rearview mirror assembly for an industrial vehicle comprising a C-shaped supporting element, a mirror attached to this supporting element, hinging means for attaching the supporting element in a projecting position to the body of the vehicle defining at least one preferential angular position of the supporting element, and a telescopic rod connected to a lower arm of the supporting element and to a bracket fixed to the vehicle body, so as to reduce the vibrations during use of the supporting element and equipped with elastic means exerting a return force on the arm.

10 Claims, 3 Drawing Sheets

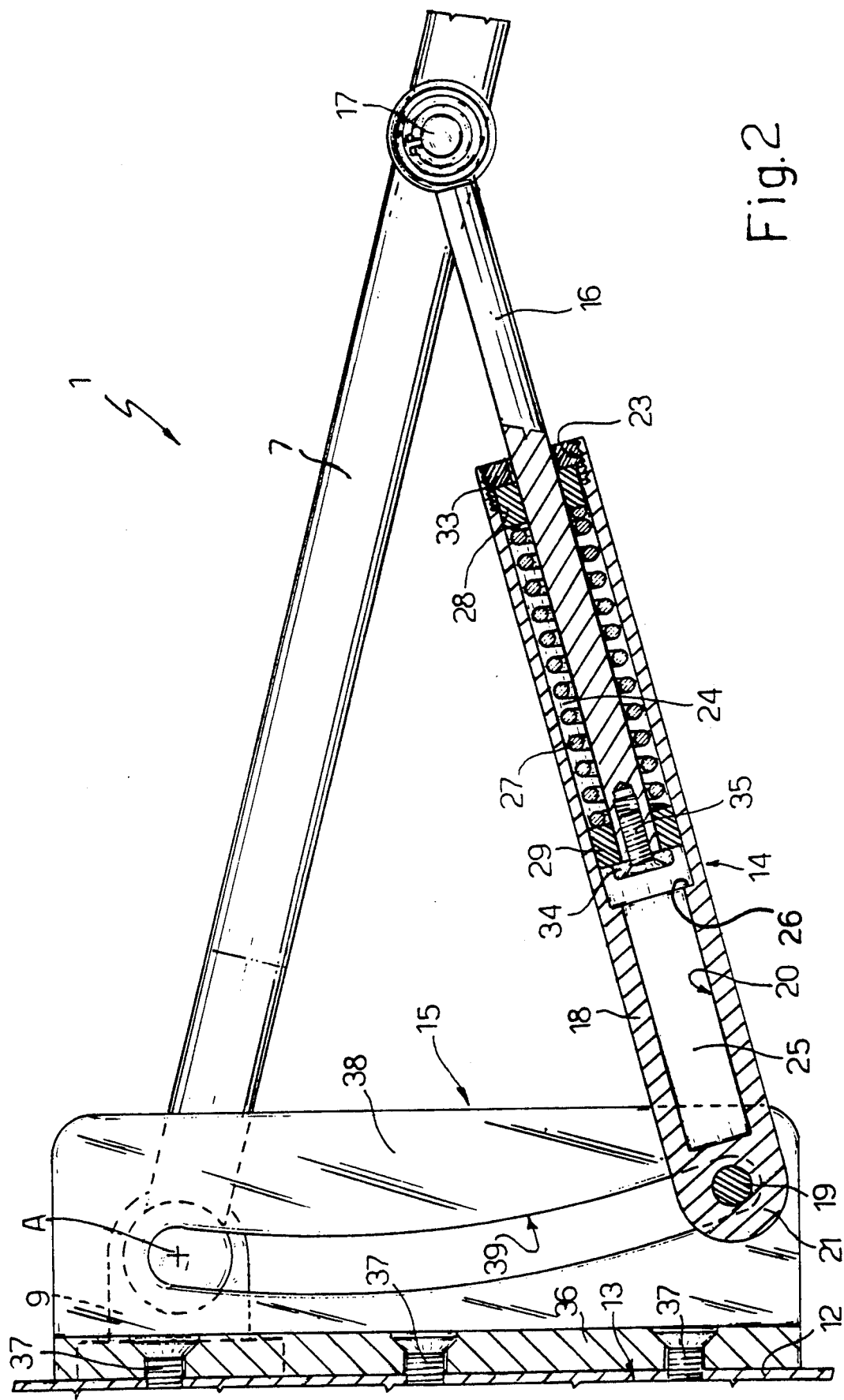

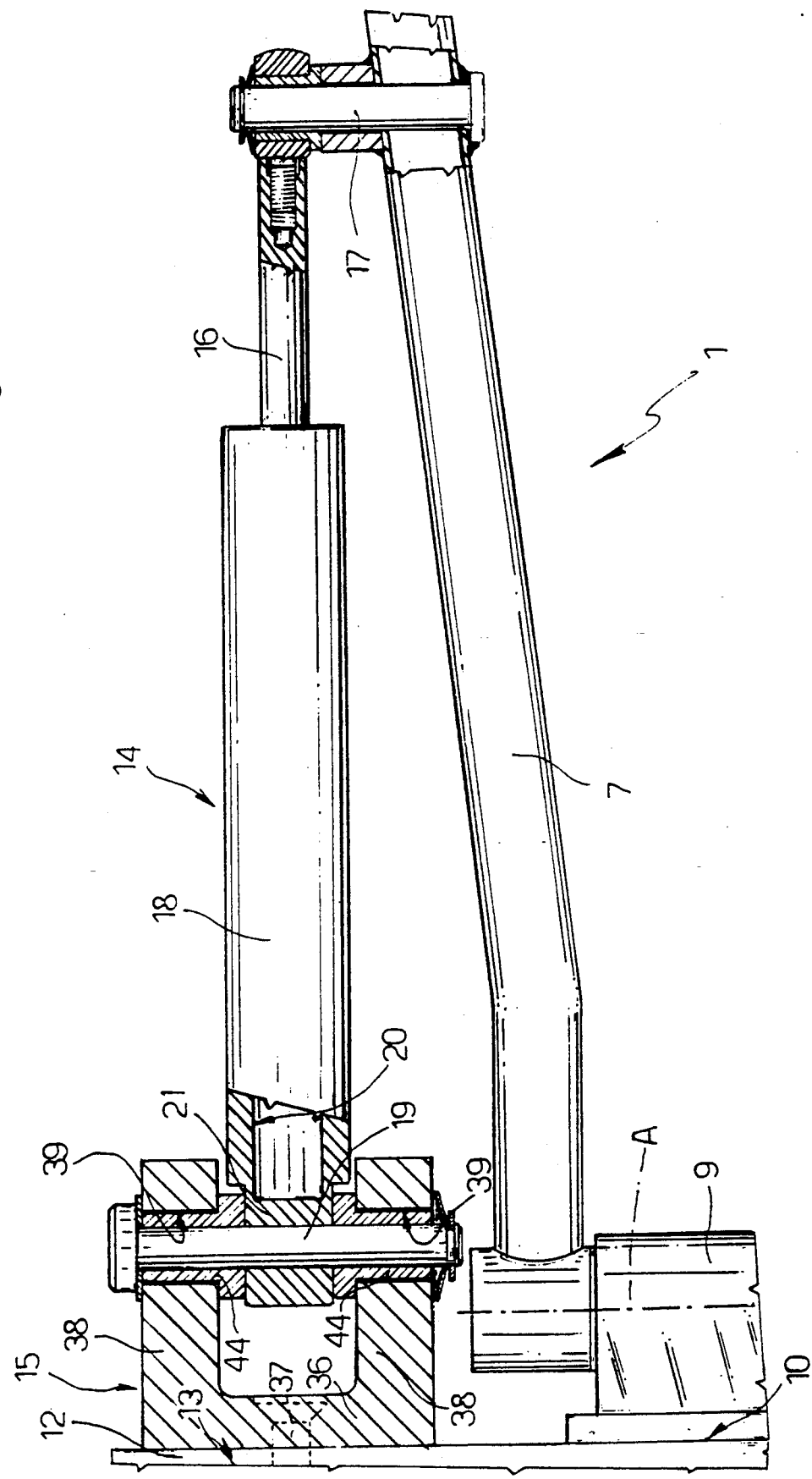

REARVIEW MIRROR ASSEMBLY FOR A VEHICLE

BACKGROUND OF THE INVENTION

The present invention relates to a rearview mirror assembly, and in particular, but not exclusively, to an external rearview mirror for industrial vehicles. External rearview mirror assemblies for industrial vehicles are known to generally comprise a substantially C-shaped supporting element hinged at its ends to a side part of the vehicle body, and a mirror attached to a central part of the supporting element. At least one of the points at which the supporting element is connected to the vehicle body consists of a hinge adapted to define at least one preferential stable position of the supporting element in relation to the vehicle body.

Known external rearview mirror assemblies described in brief present one drawback. When the vehicle is in motion, vibrations are created and transmitted to the supporting element by the car body; here they are amplified due to its projecting position thus causing the mirror and the image reflected to oscillate.

SUMMARY OF THE INVENTION

The aim of the present invention is to provide an external rearview mirror assembly for industrial vehicles, which overcomes the drawback of the known rearview window assemblies described above.

In accordance with the present invention there is provided a rearview mirror assembly for industrial vehicles, of the type comprising a mirror, a supporting element to which said mirror is attached, and hinging means for the connection of said supporting element in a projecting position to at least a first area of the body of said vehicle, said hinging means defining at least one preferential angular position of said supporting element in relation to said vehicle body, characterized in that it comprises at least one rod defining an auxiliary attachment between said supporting element and a second area of said vehicle body, said rod comprising elastic means exerting a force on said supporting element towards said second area of the vehicle body at least when said supporting element is located near said preferential angular position.

BRIEF DESCRIPTION OF THE DRAWINGS

The present invention is described in the form of a preferred embodiment by way of example with reference to the enclosed drawings, in which:

FIG. 2 is a view from above, on an enlarged scale, and a sectional view of part of the rearview mirror assembly shown in FIG. 1, and FIG. 3 is an elevated front view, on an enlarged scale, and a sectional view of part of the rearview mirror assembly shown in FIG. 1.

DETAILED DESCRIPTION OF THE INVENTION

Figure 1:
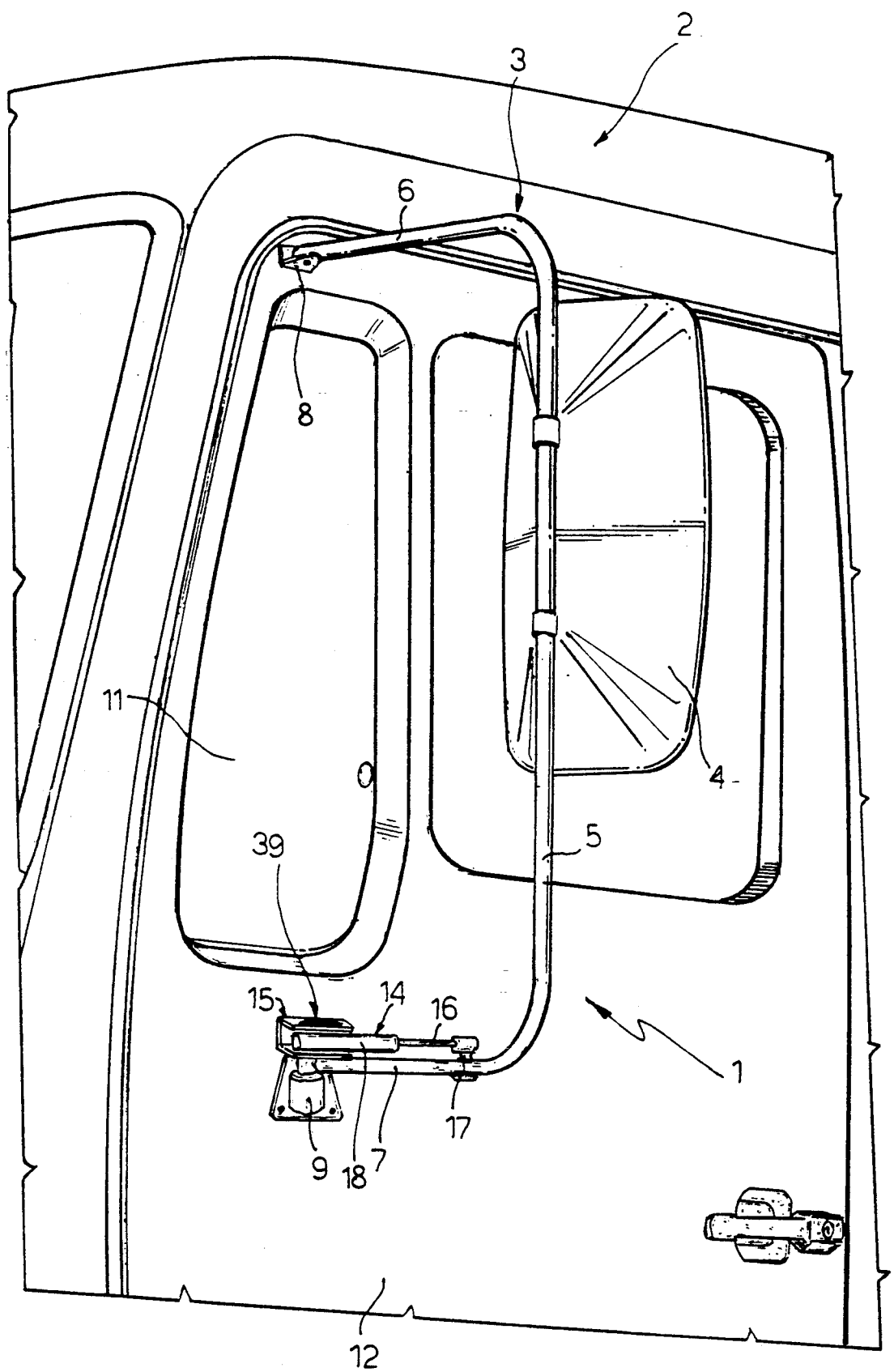
FIG. 1 is a perspective view of a rearview window assembly in accordance with the present invention, applied to an industrial vehicle.

In reference to the figures, the numeral 1 refers to the rearview mirror assembly, in its entirety, adapted to be applied to an industrial vehicle 2, illustrated in part.

Assembly 1 comprises, in a known fashion, a supporting element 3 hinged in a projecting position to the body of vehicle 2, and a mirror 4 attached to supporting element 3.

In particular, supporting element 3 is made of metal tubing bent to form a substantially C shape and comprises a central vertical section 5, to which mirror 4 is attached in an adjustable fashion, and a couple of approximately horizontal upper and lower arms 6, 7, which are hinged at their free ends, respectively, to a bracket 8 and a support 9, fixed to the body of vehicle 2 and defining a rotational axis A (FIG. 2) of supporting element 3.

In particular, support 9, of a known type, is fixed to a first section 10 of the vehicle body, suitably below a side window 11 of a door 12 of the vehicle, and is of the type adapted to define at least one preferential angular position (or for normal use) of supporting element 3 in relation to the body of vehicle 2; this position, shown in the figures, is suitably inclined towards the front, in relation to a plane across the vehicle comprising axis A, preferably at an angle of approximately 14°.

Supporting element 3 can be rotated forwards and backwards with respect to the preferential position, to enable the rearview mirror assembly 1 to be blocked against the vehicle body, accidentally in the event of a bump or voluntarily should the need arise. In accordance with the present invention, assembly 1 comprises an auxiliary rod 14 attaching supporting element 3 to a bracket 15 fixed to a second area 13 of the vehicle body, near support 9.

Rod 14 is telescopic and is comprised of stem 16 hinged to a pin 17 held by lower arm 7 of supporting element 3 and a cylindrical tube 18 hinged at one end 21 to a vertical pin 19 housed and guided in bracket 15, as described later on.

Stem 16 slides inside an internal chamber 20 of tube 18, comprising a first section 24 with a larger diameter to an inlet 23 of chamber 20, and a second section 25 with a smaller diameter, adjacent to end 21; said first and second sections 24, 25 define between them an intermediate shoulder 26.

Around the section of stem 16 housed in the first section 24 of chamber 20, there is a helicoidal spring 27, interacting at its ends with respective bearing rings 28, 29 mounted free to slide along stem 16 and inside section 24, and held along an axis respectively by a nut 33 screwed over inlet 23 and a circular stopping plate 34 secured by screw 35 on the free end of stem 16.

Rings 28, 29 present an external diameter substantially equal to the internal diameter of section 24, plate 34 presents an external diameter substantially equal to the internal diameter of the second section 25 of chamber 20.

Bracket 15 presents a substantially C-shaped cross-section and comprises a central vertical wall 36, fixed by screws 37 to the vehicle body, and a couple of parallel, horizontal walls 38, each of which is fitted with a through slot 39 whose circumference has the form of an arc with the concave section towards the outside of vehicle 2.

End 21 of tube 18, of a flat shape, is housed between walls 38 of bracket 15 and is crossed by pin 19, onto whose end sections are mounted two antiwear bushes 44 that slide along respective slots 39.

Bracket 15 is mounted above support 9 in such a position that respective rear ends (with respect to the direction in which the vehicle is moving) of slots 39 are positioned on the rotational axis A of supporting element 3.

The various parts of rod 14 and spring 27 are of such a size that when supporting element 3 is in the preferential position defined by support 9, pin 15 is at the opposite end of slots 39 with respect to axis A (FIG. 2), and spring 27 is compressed.

Rearview mirror assembly 1 operates in the following manner. In the preferential position of supporting element 3, spring 27 exerts a force on stem 16, by means of ring 29, plate 34 and screw 35, towards the inside of tube 18, transmitted by stem 16 to supporting element 3.

The intensity of this force is not sufficient to overcome the stopping force exerted on supporting element 3 by support 9, but has a stabilizing action on supporting element 3. Therefore, the further link provided by rod 14 on supporting element 3 drastically limits oscillation, thus increasing the efficiency of rearview mirror assembly 1.

Rod 14 is designed so that supporting element 3 may be tilted forwards or backwards when forces are applied accidentally or voluntarily in these directions.

In particular, if the arm is pressed forwards with a force that is stronger than the stopping action of support 9, rotation of supporting element 3 is first favoured by the recalling action of spring 27, until ring 29 is blocked against shoulder 26, discharging on said shoulder the action of spring 27. If supporting element is rotated yet further, stem 16 moves into the second section 25 of chamber 20 of tube 18, and slides freely without any elastic action. Rod 14 thus has no effect, allowing supporting element 3 to be pressed back completely. In the last stage of rotation, plate 34 strikes against the rear of chamber 20, thus preventing a further reduction in the length of rod 14; therefore, from this position on, pin 19 moves along slots 39.

When forces are applied to rotate supporting element 3 backwards, initial rotation occurs against the action of rod 14, as stem 16 partially protrudes from tube 18 compressing spring 27 yet further. Subsequently, having reached an angular position in which the force exerted by spring 27 and transmitted by tube 18 to pin 19 presents a component that is at a tangent to slots 39 sufficient to offset friction, pin 19 begins to slide along slots 39 and spring 27 is gradually released, until pin 19 reaches the opposite end of slots 39. During the last stage of rotation, supporting element 3 and rod 14 are hinged to axis A, and so the force exerted by spring 27 has no effect on this axis and does not substantially obstruct rotation.

An examination of the features of rearview mirror assembly 1 in accordance with the present invention clearly shows the advantages that may be obtained. In particular, rod 14 is an auxiliary means of attaching supporting element 3, considerably reducing vibration during use, yet maintaining complete freedom of rotation about its hinging axis A.

To assembly 1 described above modifications and variants may be made without exceeding the scope of the present invention. In particular, two rods 14 may be used by applying them to respective arms 6, 7 of supporting element 3, the embodiment of rod 14 may be modified as can its connecting means, as well as the form of bracket 15.

We claim:

1. In a rearview mirror assembly for industrial vehicles, having a mirror, a supporting element to which said mirror is attached, and hinging means for connecting said supporting element in a projecting position with a first area of the body of said vehicle, said hinging means defining at least one preferential angular position of said supporting element in relation to said vehicle body, wherein the improvement comprises at least one rod providing an auxiliary attachment between said suporting element and a second area of said vehicle body, said rod comprising a tube and a stem, said stem sliding along an internal chamber of said tube, said stem attaching to a first pin on said supporting element to form a first pivot, said tube attaching to a second pin to form a second pivot, said second pin secured to a bracket at said second area of said vehicle body, said bracket comprising at least one substantially horizontal wall with an arc-shape through-slot in which said second pin is mounted to freely slide in a arcuate manner, said rod further comprising a spring disposed within said tube; said spring exerting a force on said stem urging said supporting element towards said second area of the vehicle body when said supporting element is located near said preferential angular position.

2. A rearview mirror assembly for industrial vehicles comprising:
   a mirror;
   a supporting element to which said mirror is attached;
   hinging means for connecting said supporting element in a projecting position to at least a first support means fixed to a first lateral portion of a body of said vehicle;
   said hinging means defining at least one preferential angular position of said supporting element in relation to said vehicle body;
   a telescopic auxiliary rod connected by respective pins at one end to said supporting element and at the other end to a bracket fixed to a second lateral portion of said vehicle body, said auxiliary rod having a tube and a stem slidingly received in an internal chamber of said tube, said auxiliary rod further having a spring coiled around said stem inside said tube, said spring being compressed between a first stopping means attached to an inlet of said tube and a second stopping means attached to the end of said stem disposed within said tube, said auxiliary rod exerting a force on said supporting element towards said bracket when said supporting element is located near said preferential angular position; and
   said internal chamber of said tube having a first section with a first diameter adjacent to said inlet section and slidably receiving said first and second stopping means therein, and a second section having a diameter smaller than the diameter of said stopping means but larger than the diameter of said stem, said second stopping means being slidable along said stem.

3. The assembly as claimed in claim 2, wherein said bracket presents at least one substantially horizontal wall with a through slot in which said end pin of said rod connected to said bracket is mounted free to slide.

4. The assembly as claimed in claim 3, wherein said slot is a concave shaped slot with its concave part facing towards the outside of said vehicle.

5. The assembly as claimed in claim 2, wherein said supporting element comprises a substantially C-shaped member and having a central part to which said mirror is attached in an adjustable fashion, and an upper arm and a lower arm attached by said hinging means to said body of said vehicle; said hinging means attaching said lower arm to said body of said vehicle defining said preferential position of said supporting element with respect to said vehicle body.

6. The assembly as claimed in claim 5, wherein said rod is attached to said lower arm of said supporting element.

7. A rearview mirror assembly for industrial vehicles comprising;
   a mirror;
   a supporting element to which said mirror is attached;
   hinging means for connecting said supporting element in a projecting position to at least a first support means fixed to a first lateral portion of a body of said vehicle;
   said hinging means defining at least one preferential angular position of said supporting element in relation to said vehicle body;
   a bracket fixed to a second lateral position of said vehicle body, said bracket having a horizontal wall having a through slot, a rear end of said slot located substantially on the rotating axis of said supporting element about said hinging means;
   a telescopic auxiliary rod connected by respective pins at one end to said supporting element and at the other end to said bracket, said auxiliary rod having a tube and a stem slidingly received in an internal chamber of said tube; and
   said auxiliary rod including resilient means for exerting a force on said supporting element towards said bracket when said supporting element is located near said preferential angular position.

8. The assembly as claimed in claim 7, wherein said auxiliary rod further comprises a spring coiled around said stem inside said tube and is compressed between a first stopping means attached to an inlet of said tube and a second stopping means attached to the end of said stem disposed within said tube.

9. The assembly as claimed in claim 8, wherein said internal chamber of said tube comprises a first section with a first diameter adjacent to said inlet section and slidably receiving said first and second stopping means therein, and a second section having a diameter smaller than the diameter of said stopping means but larger than the diameter of said stem; said second stopping means slidable along said stem.

10. The assembly as claimed in claim 7, wherein said preferential position of said supporting element is tilted forward with respect to a cross plane passing through said rotational axis (A) of said supporting element.

* * * * *